(12) United States Patent
Koreeda

(10) Patent No.: US 7,023,596 B2
(45) Date of Patent: Apr. 4, 2006

(54) SCANNING OPTICAL SYSTEM

(75) Inventor: Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 83 days.

(21) Appl. No.: 10/356,490

(22) Filed: Feb. 3, 2003

(65) Prior Publication Data
US 2003/0146376 A1    Aug. 7, 2003

(30) Foreign Application Priority Data
Feb. 4, 2002 (JP) .............................. 2002-026590

(51) Int. Cl.
G02B 26/08 (2006.01)

(52) U.S. Cl. ...................................... 359/205

(58) Field of Classification Search ................ 359/205, 359/206, 212, 216, 217, 218, 219
See application file for complete search history.

(56) References Cited

U.S. PATENT DOCUMENTS

| 5,541,760 | A | 7/1996 | Iizuka |
|---|---|---|---|
| 5,646,767 | A | 7/1997 | Iima et al. |
| 5,737,112 | A | 4/1998 | Iizuka |
| 5,896,218 | A | 4/1999 | Iizuka |
| 6,028,688 | A | 2/2000 | Iizuka |
| 6,104,521 | A | 8/2000 | Iizuka |
| 6,512,623 | B1 * | 1/2003 | Ishihara ...................... 359/205 |

FOREIGN PATENT DOCUMENTS

| JP | 5346553 | 12/1993 |
|---|---|---|
| JP | 7230051 | 8/1995 |

OTHER PUBLICATIONS

English Langauge Translation of JP Appln. No. 5-346553.

* cited by examiner

Primary Examiner—Euncha P. Cherry
(74) Attorney, Agent, or Firm—Greenblum & Bernstein, P.L.C.

(57) ABSTRACT

A scanning optical system includes first and a second lens elements, at least one of which is a plastic lens element. Each surface of the plastic lens element is an aspherical surface that is configured such that a shape in a main scanning plane is defined as a function of a distance, in the main scanning direction, from a surface reference axis thereof, and that a curvature in an auxiliary scanning plane which is perpendicular to the main scanning plane is defined as another function of a distance, in the main scanning direction, from the surface reference axis. At least one of the two surfaces of the plastic lens element are arranged such that the surface reference axis thereof is decentered from an axis of the beam in the auxiliary scanning direction.

17 Claims, 16 Drawing Sheets

SCANNING OPTICAL SYSTEM

BACKGROUND OF THE INVENTION

The present invention relates to a scanning optical system having two lens elements including at least one plastic lens element, surfaces of the two lens elements being processed to prevent a ghost due to reflection of light between surfaces.

A scanning optical system employed in a laser beam printer, a laser scanner or a bar code reader is typically configured such that a laser beam emitted by a light source is deflected by a deflector such as a polygonal mirror, which is rotated at a constant angular speed so that the laser beam scans in a predetermined angular range. The scanning beam is directed to pass through a scanning optical system having an fθ characteristic in a main scanning direction, which is a scanning direction of the beam. The laser beam is converged by the scanning optical system on a surface to be scanned to form a beam spot, which moves in the main scanning direction at a constant speed.

In order to cancel a shift of a position of the beam spot in an auxiliary scanning direction, which is perpendicular to the main scanning direction, on the surface to be scanned due to facet errors of reflection surfaces of the deflector, the laser beam emitted by the light source and collimated by a collimating lens is converged in the auxiliary scanning direction using a cylindrical lens arranged on an upstream side of the deflector so that the laser beam is converged in the auxiliary scanning direction on or in the vicinity of a reflection surface of the deflector. In such a case, the scanning optical system is configured such that the reflection surface of the deflector and the surface to be scanned have a conjugate relationship in the auxiliary scanning direction, while the scanning optical system converges the parallel light on the surface to be scanned in the main scanning direction.

As above, the scanning optical system generally has the fθ characteristic in the main scanning direction, and further the reflection surface of the deflector and the surface to be scanned have the conjugate relationship with respect to the scanning optical system.

Conventionally, such a scanning optical system consists of a plurality of glass lens elements. Each surface of the glass lens elements is processed to have an anti-reflection coating in accordance with a conventional method. With such a configuration, a ghost, which is formed as stray light reflected by the surfaces of the lens elements reaches the surface to be scanned, is insignificant.

Recently, however, plastic lenses are widely employed in order to reduce costs. When the plastic lenses are employed, due to technical problems and/or in view of manufacturing costs, there are cases where the anti-reflection coating is not formed on each surface of the plastic lens elements.

As a result, if the plastic lens elements are used as a part of or all of the lens elements of a scanning optical system, a possibility that the reflected light between the surfaces of the lens elements is generated becomes significant, which results in a significant effects of the ghost on the quality of the formed image of the laser beam printer or the captured image of the laser scanner.

Therefore, conventionally, various measures to deal with the ghost due to the surface-to-surface reflection in the scanning optical system have been suggested. One of such suggestions is disclosed in Japanese Patent Provisional Publication No. HEI 7-230051 of the present assignee. According to teachings of the publication, a predetermined surface of the plastic lens of the scanning optical system is decentered in the auxiliary scanning direction with respect to a reference scanning plane, which is defined as a plane on which the axis of the laser beam before incident on the scanning optical system scans, and a bow (curvature of a scanning line, which is a locus of a scanning beam on the surface to be scanned) due to the decentering of the predetermined surface of the plastic lens is compensated by decentering another lens surface in an opposite direction.

Embodiments of the above-identified publication having two lens elements are configured such that a spherical surface, cylindrical surface or toric surface is decentered, and therefore optical performance of the scanning system is insufficient. The scanning optical system consists of two lens elements are arranged at a position relatively close to the deflector. In order to compensate for the facet error, such a scanning optical system is required to have a relatively strong power in the auxiliary scanning direction. If a surface having a relatively simple surface (e.g., spherical, cylindrical or toric surface) which has a strong power is decentered, even though a bow is compensated, inclination of a scanning line and/or wavefront distortion may occur, which cannot be sufficiently suppressed. The inclination of the scanning line and/or the wavefront distortion may deteriorate the imaging quality.

SUMMARY OF THE INVENTION

The present invention is advantageous in that, although a scanning optical system consists of two lens elements, one or both of which is a plastic lens, and at least one lens surface is decentered with respect to a reference scanning plane, not only the bow, but also the inclination of the scanning line and/or wavefront distortion can be suppressed, and further the curvature of field is also compensated for.

According to an aspect of the invention, there is provided a scanning optical system for converging a beam scanning in a main scanning direction on a surface to be scanned. The scanning optical system includes a first lens element and a second lens element, at least one of the first lens element and the second lens element being a plastic lens element formed of plastic material. Each of two surfaces of the plastic lens element is an aspherical surface that is configured such that a shape in a main scanning plane is defined as a function of a distance, in the main scanning direction, from a surface reference axis thereof. Further, each of two surfaces of the plastic lens element is configured such that a curvature in an auxiliary scanning plane which is perpendicular to the main scanning plane is defined as another function of a distance, in the main scanning direction, from the surface reference axis. Further, at least one of the two surfaces of the plastic lens element being arranged such that the surface reference axis thereof is decentered from an axis of the beam in the auxiliary scanning direction.

Optionally, the surface reference axis of the at least one of the two surface of the plastic lens element is parallely shifted in the auxiliary scanning plane with respect to the axis of the beam. Alternatively, each of the surface reference axes of the two surfaces of the plastic lens element is inclined, in the auxiliary scanning plane, with respect to the axis of the beam.

In a particular case, both of the two surfaces of the plastic lens element being arranged such that the surface reference axes thereof are decentered (i.e., parallely shifted or inclined) with respect to an axis of the beam in the auxiliary scanning direction, respectively.

Optionally, when the two surfaces of the plastic lens element are parallely shifted, they may be arranged to satisfy condition:

$$1.0<|\delta 1-\delta 2|<3.0,$$

wherein, δ1 and δ2 (unit: mm) represent decentering amounts of the surface reference axes of the two lens surfaces with respect to the axis of the beam.

Optionally, the two lens elements may be the plastic lens element and a glass lens element, and two lens surfaces of the glass lens element are a planar surface and a toric surface, respectively. Further, the scanning optical system may be configured to satisfy condition:

$$0.7<fgz/fz<1.8,$$

where, fgz is a focal length of the glass lens element in the auxiliary scanning direction, and fz is a focal length of the entire scanning optical system in the auxiliary scanning direction.

Further optionally, the scanning optical system may be configured to satisfy condition:

$$1.0<|m|<4.0,$$

where, m represents a magnification of the scanning optical system in the auxiliary scanning direction.

According to another aspect of the invention, there is provided a scanning unit, which includes a light source that emits a beam, a deflector that deflects the beam to scan within a predetermined angular range in a main scanning direction, a scanning optical system for converging the beam scanned by the deflector on a surface to be scanned, the scanning system consisting of a first lens element and a second lens element, at least one of the first lens element and the second lens element being a plastic lens element formed of plastic material. Further, each of two surfaces of the plastic lens element is an aspherical surface that is configured such that a shape in a main scanning plane is defined as a function of a distance, in the main scanning direction, from a surface reference axis thereof and that a curvature in an auxiliary scanning plane which is perpendicular to the main scanning plane is defined as another function of a distance, in the main scanning direction, from the surface reference axis, and at least one of the two surfaces of the plastic lens element is arranged such that the surface reference axis thereof is decentered from an axis of the beam in the auxiliary scanning direction.

BRIEF DESCRIPTION OF THE ACCOMPANYING DRAWINGS

DESCRIPTION OF THE EMBODIMENTS

Figure 1:
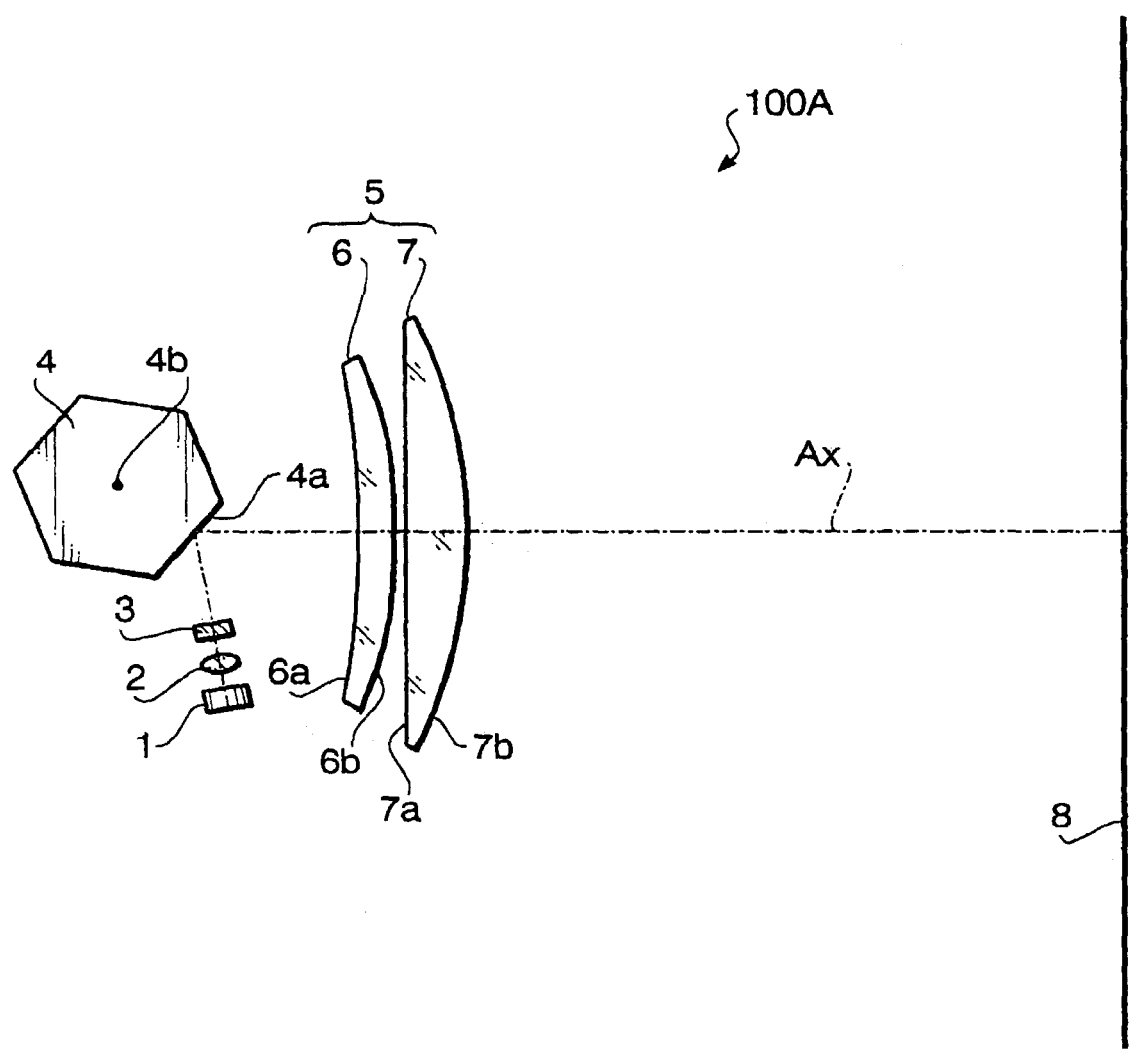
FIG. 1 shows a configuration of a scanning unit employing a scanning optical system according to a first embodiment in a main scanning direction.

Hereinafter, the present invention will be described in detail with reference to the accompanying drawings.

Initially, a basic configuration of the scanning optical system will be described.

The scanning optical system according to the invention is used for converging a light beam, which is emitted by a light source and deflected by a deflector in the main scanning direction, on a surface to be scanned. The scanning optical system consists of two lens elements separately arranged. At least one of the two lens elements is a plastic lens element. Each of the two surfaces of the plastic lens element has an aspherical surface which is configured such that a shape in the main scanning direction is defined as a function of a distance in the main scanning direction with respect to a surface reference axis, and curvature in the auxiliary scanning direction, which is perpendicular to the main scanning direction, is defined as another function of a distance in the main scanning direction with respect to the surface reference axis. At least one of the two aspherical surfaces is decentered in the auxiliary scanning direction with respect to a reference beam axis.

It should be noted that the term "surface reference axis" means, in this specification, of an optical axis of a surface of a lens. In the embodiments described hereinafter, the lens surfaces are decentered with respect to the reference beam axis. an axis of the scanning optical system. In such a case, the optical axes of the surfaces which are decentered do not coincide with the optical axis of the scanning optical system. In order to avoid confusion of the axes of the decentered surfaces and the optical axis of the scanning optical system, the former axes are referred to as the surface reference axes, and the latter is referred to a central axis of a beam or a beam axis.

It should be noted that, in this specification, a direction in which the beam (beam spot) travels on the surface to be scanned is referred to as the main scanning direction, and a direction perpendicular to the main scanning direction on the surface to be scanned is referred to as the auxiliary scanning direction. Further, a central axis of the laser beam directed to the center of a scanning range in the main scanning direction is referred to as the reference beam axis. A plane parallel with the main scanning direction and including the reference beam axis is referred to as a main scanning plane, and a plane perpendicular to the main scanning plane and the main scanning direction is referred to as an auxiliary scanning plane.

Similar to the conventional scanning optical system mentioned above, according to the invention, at least one of the lens surfaces is decentered with respect to the reference beam axis in the auxiliary scanning direction. With this configuration, reflected light beams generated by the lens surfaces are directed away from a regular beam so that the reflected beams are prevented from being incident on the surface to be scanned, thereby the ghost due to the surface-to-surface reflection can be prevented. It should be noted that it is difficult to decenter a surface of a glass lens due to manufacturing reason. Thus, it is practical that a surface of at least one plastic lens included in the scanning optical lens is decentered.

Further, when the scanning optical system is of a type which does not have an elongated lens provided in the vicinity of the surface to be scanned, which has a power in the auxiliary scanning direction, one of the surface of the two lenses located closer to the deflector should have a relatively strong power in the auxiliary scanning direction. Further, in order to prevent the above-described the ghost caused by the surface-to-surface reflection, the surface having a strong power in the auxiliary scanning direction should be decentered.

Furthermore, in order to compensate for curvature of field, the aspherical surface as explained above is necessary, and it is difficult to form such an aspherical surface on a glass surface. Therefore, the aspherical surface as described above should be formed on the plastic lens.

In view of the above, it is preferable that one surface of the plastic lens included in the scanning optical system has the above-described aspherical surface, and the aspherical surface is decentered with respect to the axis of the light beam.

If one lens surface is decentered from the reference beam axis, however, the bow, inclination of the scanning line and wavefront distortion may appear as described above. In order to deal with this problem, another lens surface of one or two plastic lenses included in the scanning optical system is also formed to have the aspherical surface as described above. As a result, in the scanning optical system consisting of two lens elements, the ghost due to the surface-to-surface reflection can be prevented, curvature of field can be compensated, and further, the bow and inclination of scanning line, and wave front distortion can also be suppressed.

It should be noted that the surface reference axis of the aspherical surface maybe shifted (parallely translated) or tilted. It should be noted, however, it is preferable to shift the surface reference axis from the reference beam axis.

When the surface reference axis is shifted from the axis of the beam, it is preferable that condition (1) is satisfied:

$$1.0<|\delta 1-\delta 2|<3.0 \tag{1}$$

where, $\delta 1$ and $\delta 2$ (unit: mm) represent decentering amounts of the two lens surfaces each having the aspherical surface as described above with respect to the reference beam axis.

If $|\delta 1-\delta 2|$ is smaller than the lower limit (i.e., 1.0), the ghost due to the surface-to-surface reflection cannot be prevented sufficiently. If $|\delta 1-\delta 2|$ is larger than the upper limit (i.e., 3.0), the decentering amount is too large, and the performance as the scanning optical system becomes insufficient.

As described above, the scanning optical system according to the invention includes at least one plastic lens. That is, the scanning optical system may includes one plastic lens element and one glass lens element, or two plastic lens elements.

In the former case, both surfaces of the plastic lens element are formed as the aspherical surfaces as defined above, and the surface reference axis of at least one of the aspherical surfaces is decentered from the axis of the light beam. It should be noted that only one aspherical lens surface may be decentered, or both of the aspherical lens surfaces may be decentered from each other and with respect to the reference beam axis.

In the latter case, the two aspherical surfaces may be the surfaces of one plastic lens, or each lens may have one aspherical lens surface.

When the scanning optical system includes one glass lens and one plastic lens, the scanning optical system may be configured such that the two surface of the glass lens are planar surface and toric surface, respectively, and condition (2) is satisfied:

$$0.7<fgz/fz<1.8 \tag{2}$$

where, fgz is a focal length of the glass lens in the auxiliary scanning direction, and fz is a focal length of the entire scanning optical system in the auxiliary scanning direction.

By forming one surface of the glass lens as the planar surface, it becomes easy to fabricate the glass lens. If fgz/fz is smaller than the lower limit, the sensitivity of the toric surface is too high and fabrication of such a surface is difficult. If fgz/fz exceeds the upper limit, the power of the plastic lens in the auxiliary scanning direction is relatively large, and is easily affected by a change of temperature.

Optionally, the scanning optical system may satisfy condition (3):

$$1.0<|m|<4.0 \tag{3}$$

where m represents a magnification of the scanning optical system in the auxiliary scanning direction. If the scanning optical system satisfies condition (3), a power of the surface closer to the deflector in the auxiliary scanning direction is large, and a quantity of aberration due to decentering is large. In such a scanning optical system, the aberration can be well suppressed by applying the invention. That is, according to the invention, even in a scanning optical system satisfying condition (3), the ghost due to the surface-to-surface reflection can be prevented, and the bow, the inclination of the scanning line and the wavefront distortion can be well suppressed. It should be noted that, if the absolute value |m| of the magnification of the scanning optical system is smaller than the lower limit of condition (3), the scanning optical system may become too large, while if |m| is greater than the upper limit, the lenses are sensitive in positioning, and assembling of the scanning optical system becomes difficult.

Figure 2:
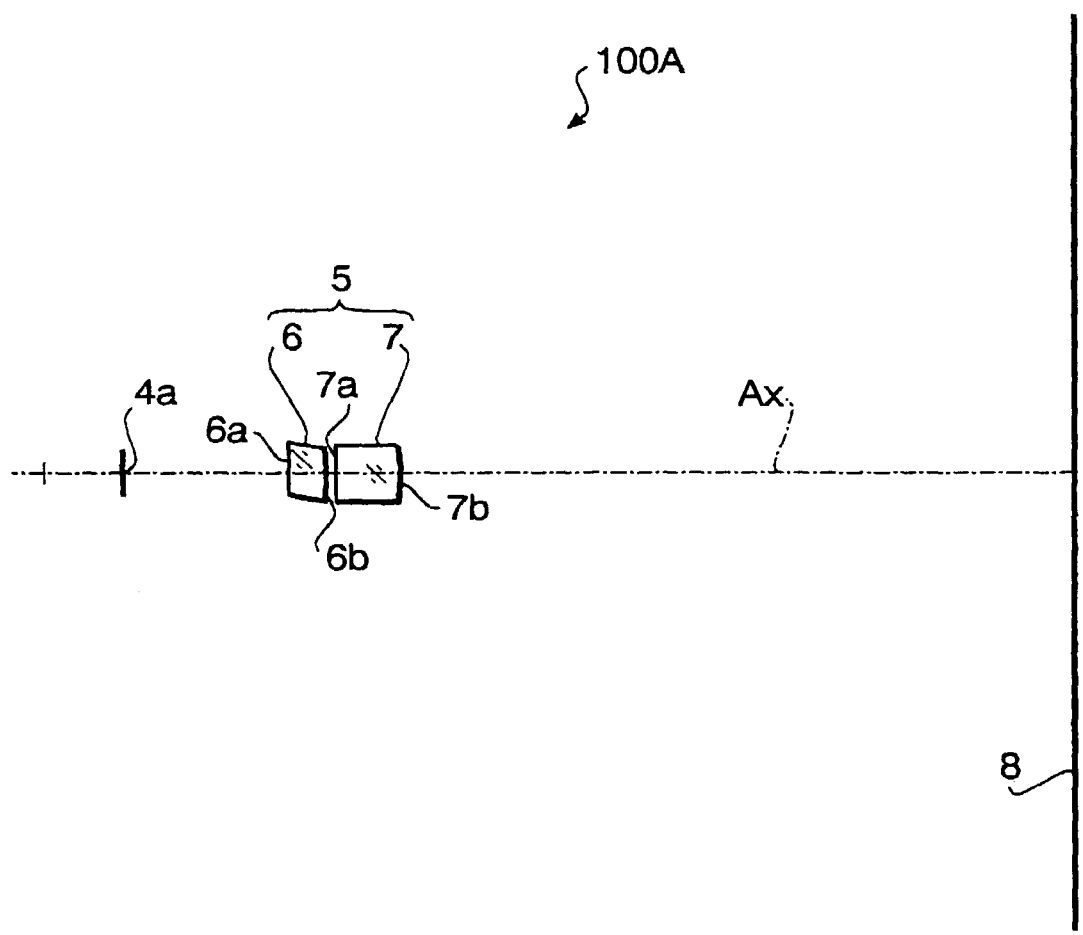
FIG. 2 shows a configuration of a scanning unit employing a scanning optical system according to the first embodiment in an auxiliary scanning direction.

FIG. 1 shows a configuration of a scanning unit 100A employing a scanning optical system 5 according to a first embodiment in a main scanning direction. FIG. 2 shows a configuration of the scanning unit 100A on the auxiliary scanning plane.

The scanning unit 10A includes a laser diode 1, a collimating lens 2, a cylindrical lens 3, a polygonal mirror 4 and the scanning optical system 5.

The laser beam emitted by the laser diode 1 is collimated by the collimating lens 2, and is incident on the cylindrical lens 3, The cylindrical lens 3 has a power only in the auxiliary scanning direction, and converges the laser beam on or in the vicinity of the reflection surface 4a of the polygonal mirror 4 to form a line-like image. The laser beam is then deflected by the surface 4a of the polygonal mirror 4, which revolves at a predetermined angular speed so that the deflected laser beam scans within a predetermined angular range. The deflected laser beam passes through the scanning optical system 5 and is converged on a surface 8 to be scanned, thereby a beam spot which moves in the main scanning direction is formed on the surface 8.

The polygonal mirror 4 is a regular polygon having a plurality of reflection surface 4a, each of which is parallel with a rotation axis 4b thereof. If the reflection surfaces 4a of the polygonal mirror 4 do not have the facet errors, the beam deflected by the polygonal mirror 4 proceeds on the main scanning plane. Hereinafter, the central axis of the laser beam directed to the center of the scanning range in the main scanning direction is referred to as a reference beam axis Ax.

The scanning optical system 5 is arranged such that the reflection surface 4a (or a plane on which the beam passed through the cylindrical lens 3 is converged, in the auxiliary scanning direction) and the surface 8 to be scanned have a conjugate relationship in the auxiliary scanning direction. That is, the scanning optical system 5 converges the beam, which is converged, in the auxiliary scanning direction, on or in the vicinity of the reflection surface 4a, on the surface 8 to be scanned. Further, the scanning optical system 5 is configured such that the incident beam, which has parallel light fluxes in the main scanning direction, is converged on the surface 8 to be scanned. It should be noted that the scanning optical system 5 has a function of compensating for curvature of field, and thus, regardless of the incident angle of the beam incident on the scanning optical system 5, the beam is converged on the surface 8 to be scanned. Further, the scanning optical system 5 has an fθ characteristic, and as the incident beam scans at a constant angular speed, the beam spot formed on the surface 8 moves at a constant speed.

The surface 8 is arranged to be perpendicular to the reference beam axis Ax.

FIRST EMBODIMENT

FIGS. 1 and 2 show the configuration of the scanning unit 100A employing a scanning optically system 5 according to the first embodiment. As shown in the drawings, according to the first embodiment, the scanning optical system 5 includes, from the polygonal mirror side to the surface 8 side, a first lens 6 that is a positive meniscus lens made of plastic and a second lens 7 that is a plano-convex lens made of glass. The polygonal mirror 4 side surface of the first lens 6 is formed as a concave surface, and the planar surface of the second lens 7 is oriented toward the polygonal mirror 4 side.

Each of the polygonal mirror side surface 6a (first surface) and the scanned surface side surface 6b (second surface) is configured such that a shape in the main scanning plane is defined as a function of a distance in the main scanning direction with respect to a surface reference axis, and the curvature of thereof in the auxiliary scanning direction is defined as another function of a distance in the main scanning direction with respect to the surface reference axis. Hereinafter, such a surface will be referred to as an anamorphic aspherical surface. Each of the first surface 6a and the second surface 6b is arranged such that the surface reference axis thereof is decentered, i.e., shifted with respect to the reference beam axis Ax in the auxiliary scanning direction.

The polygonal mirror side surface 7a (third surface) of the second lens 7 is a planar surface, and the scanned surface side surface 7b (fourth surface) of the second lens 7 is a toric surface which is formed such that a curve on the main scanning plane is rotated about an axis parallel with the main scanning direction, and has a positive power.

TABLE 1 below indicates a structure of the scanning unit 100A, from the reflection surface 4a to the surface 8 to be scanned. In TABLE 1, "focal length" represents a focal length of the entire scanning optical system 5 in the main scanning direction, "scanning width" represents a width (length) of the scanning line formed on the surface 8 by the laser beam which is reflected by one of the reflection surfaces 4a and passed through the scanning optical system 5, fz represents a focal length of the entire scanning optical system in the auxiliary scanning direction, fgz is a focal length in the auxiliary scanning direction of the second lens 7 alone, and m represents a magnification of the scanning optical system 5 in the auxiliary scanning direction.

Further, δ1 represents a shifting amount, in the auxiliary scanning direction, of the surface reference axis of the first surface 6a with respect to the reference beam axis Ax, δ2 is a shifting amount, in the auxiliary scanning direction, of the surface reference axis of the second surface 6b with respect to the reference beam axis Ax, "L2" represents a shifting amount of the surface reference axes of the third and fourth surfaces 7a and 7b (i.e., the shifting amount of the second lens 7) with respect to the reference scanning plane (i.e., the reference beam axis Ax) in the auxiliary scanning direction.

It should be noted that a positive sign of the shifting amount represents that the surface reference axis of the lens surface is decentered upward in FIG. 2, and a negative sign of the shifting amount represents that the surface reference axis of the lens surface is decentered downward in FIG. 2.

Further, "No." indicates a surface number of each surface: 0 represents the reflection surface 4a; 1 represents the first surface 6a; 2 represents the second surface 6b; 3 represents the third surface 7a; and 4 represents the fourth surface 7b, "R" represents a paraxial radius of curvature of the surface in the main scanning direction, "Rz" represents a paraxial radius of the surface in the auxiliary scanning direction (which is omitted when the surface is planar), "Distance" represents a distance between an apex (at which the surface reference axis intersects the surface) of the surface to an apex of the next surface (for the fourth surface 7b, the "Distance" represents a distance from the apex of the fourth surface 7b to the surface 8 to be scanned), and "N" represents a refractive index of material between the current and the next surfaces (which is omitted when the material is the air).

TABLE 1

| Focal Length | 135.5 mm |
|---|---|
| Scanning Width | 216 mm |
| fz | 35.11 mm |
| fgz | 46.45 mm |
| m | −2.87 |
| Design Wavelength | 780 nm |

Decentering Amount in Auxiliary Scanning Direction

| | |
|---|---|
| δ1 | 2.08 mm |
| δ2 | −0.42 mm |
| L2 | 0.52 mm |

| No. | R (mm) | Rz (mm) | Distance (mm) | N |
|---|---|---|---|---|
| 0 | | | 32.20 | |
| 1 | −325.80 | −109.50 | 7.50 | 1.48617 |
| 2 | −145.50 | −38.70 | 2.00 | |
| 3 | infinity | | 13.97 | 1.60910 |
| 4 | −109.20 | −28.29 | 133.80 | |

It should be noted that the shape of the anamorphic aspherical surface in the main scanning plane is expressed by a formula (4):

$$x(y) = \frac{cy^2}{1+\sqrt{1-(\kappa+1)c^2y^2}} + A_4 y^4 + A_6 y^6 + A_8 y^8 \quad (4)$$

where, x(y) represents a SAG which is a distance of a point on the anamorphic aspherical surface to a plane tangential to the anamorphic aspherical surface on the surface reference axis thereof, and y represents a distance of the point on the surface with respect to the surface reference axis in the main scanning direction. In the formula (4), c represents a paraxial curvature (i.e., 1/R; R being a radius) of the anamorphic aspherical surface in the main scanning direction, κ represents a conical coefficient, and $A_4$, $A_6$ and $A_8$ are fourth, sixth and eighth order aspherical coefficients.

The radius Rz(y) of curvature in the auxiliary scanning plane at the point, whose distance with respect to the surface reference axis in the main scanning direction is y is expressed by formula (5) below:

$$\frac{1}{Rz(y)} = \frac{1}{Rz} + B_1 y + B_2 y^2 + B_3 y^3 + B_4 y^4 + B_5 y^5 + B_6 y^6, \quad (5)$$

where $B_1$ through $B_6$ are first through sixth order aspherical coefficients, respectively.

In the first embodiment, coefficients defining the first surface 6a and the second surface 6b of the first lens for the formulae (4) and (5) are indicated in TABLE 2.

TABLE 2

| | No. 1 | No. 2 |
|---|---|---|
| k | 0.00 | 0.00 |
| $A_4$ | −2.75 × 10$^{-6}$ | −1.81 × 10$^{-6}$ |
| $A_6$ | 1.51 × 10$^{-9}$ | 5.03 × 10$^{-10}$ |
| $A_8$ | −1.92 × 10$^{-13}$ | 7.35 × 10$^{-14}$ |
| $B_1$ | −9.46 × 10$^{-6}$ | 4.2 × 10$^{-5}$ |
| $B_2$ | −1.95 × 10$^{-6}$ | 1.25 × 10$^{-5}$ |
| $B_3$ | 0.00 | 0.00 |
| $B_4$ | −2.00 × 10$^{-11}$ | −6.14 × 10$^{-9}$ |
| $B_5$ | 0.00 | 0.00 |
| $B_6$ | 1.31 × 10$^{-13}$ | 2.35 × 10$^{-12}$ |

FIGS. 3 through 6 are graphs indicating performance of the scanning optical system according to the first embodiment.

Figure 3:
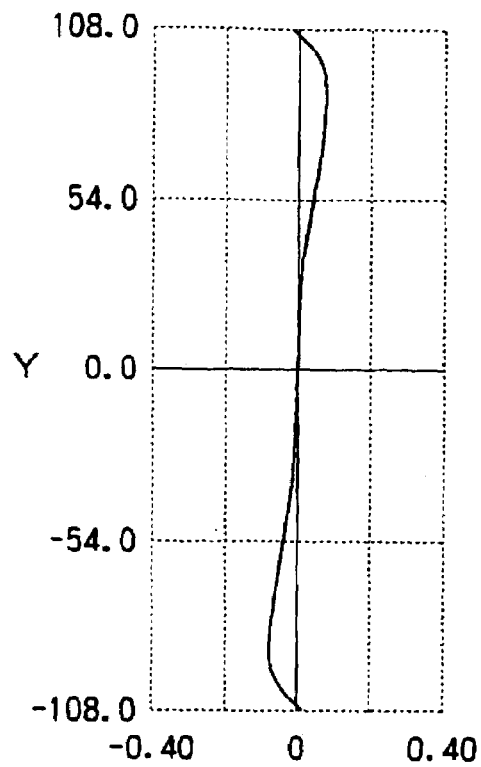
FIG. 3 shows a graph indicating an fθ characteristic of the scanning optical system according to the first embodiment.
Figure 4:
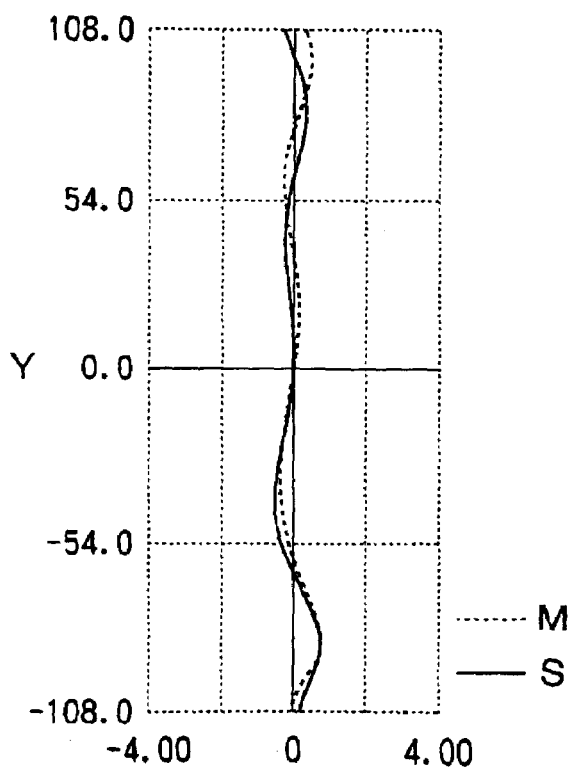
FIG. 4 shows a graph indicating curvature of field of the scanning optical system according to the first embodiment.
Figure 5:
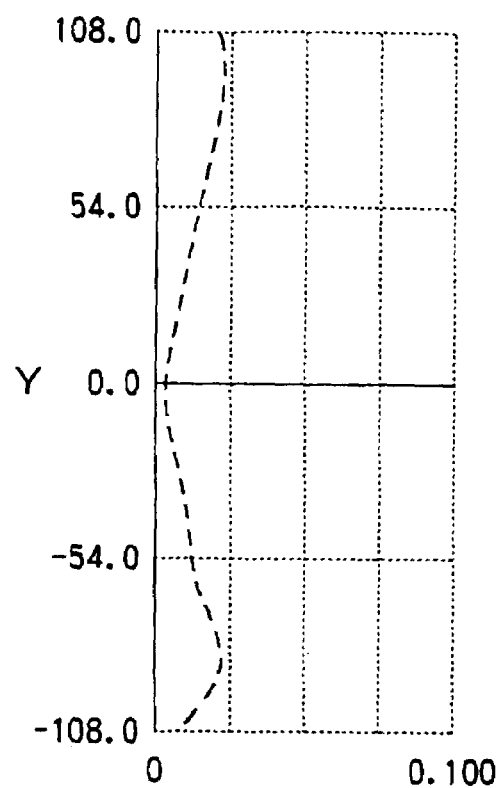
FIG. 5 shows a graph indicating wavefront aberration of the scanning optical system according to the first embodiment.
Figure 6:
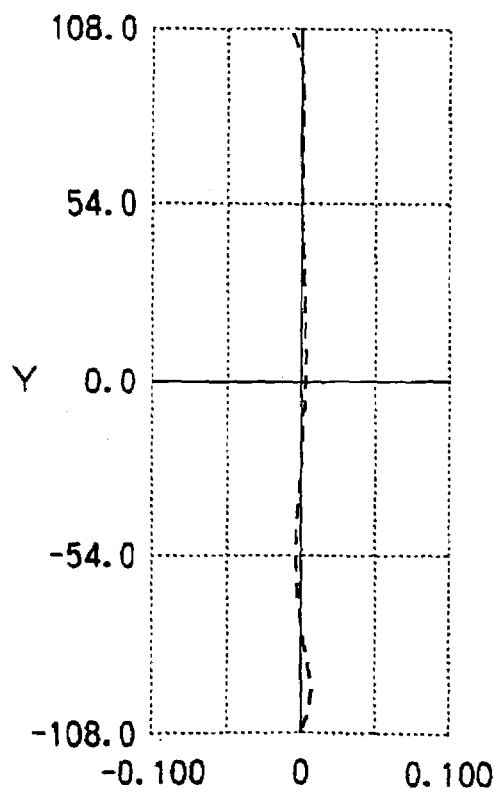
FIG. 6 shows a graph indicating bow of the scanning optical system according to the first embodiment.

FIG. 3 indicates an fθ characteristic, FIG. 4 indicates curvature of field (solid line: auxiliary scanning direction; and broken line: main scanning direction), FIG. 5 indicates an RMS of wavefront aberration and FIG. 6 indicates bow. In each graph, the vertical axis represents an image height Y (unit: mm) in the main scanning direction. The horizontal axis of each of FIGS. 3, 4 and 6 indicates quantity of the aberration (unit: mm), and the horizontal axis of FIG. 5 indicates the quantity in rms value (unit: λ).

SECOND EMBODIMENT

Figure 7:
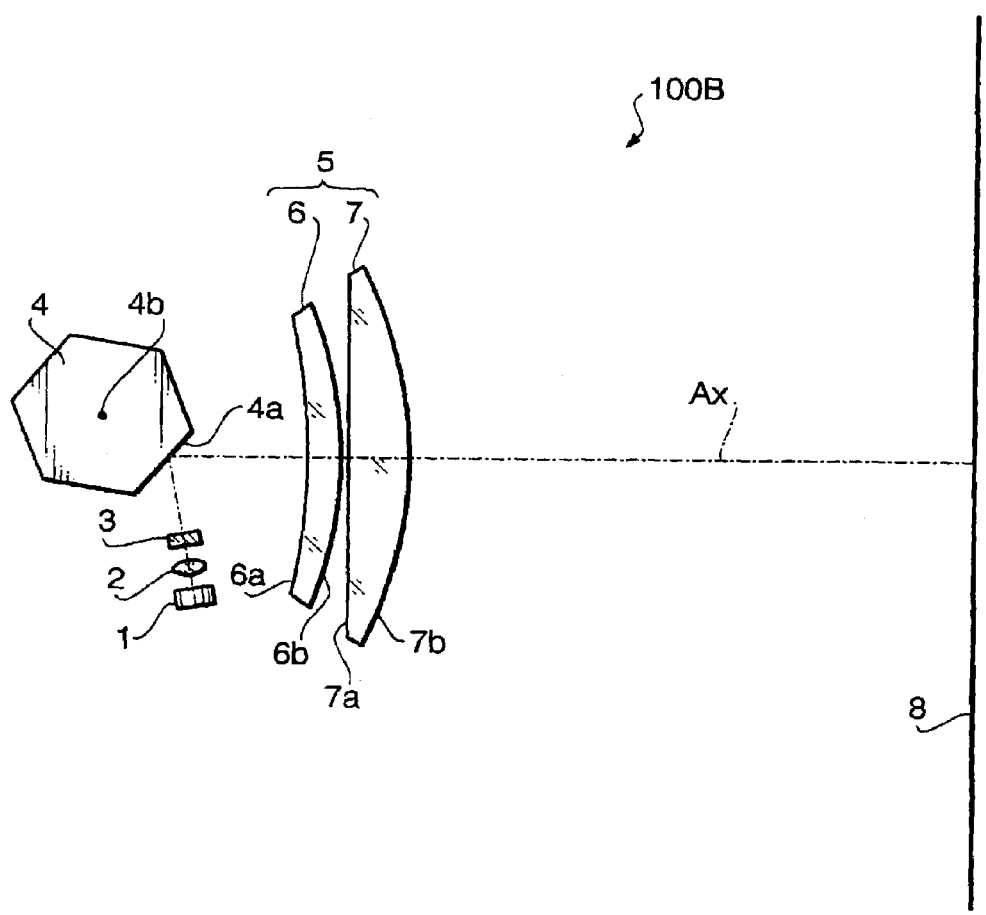
FIG. 7 shows a configuration of a scanning unit employing a scanning optical system according to a second embodiment in a main scanning direction.
Figure 8:
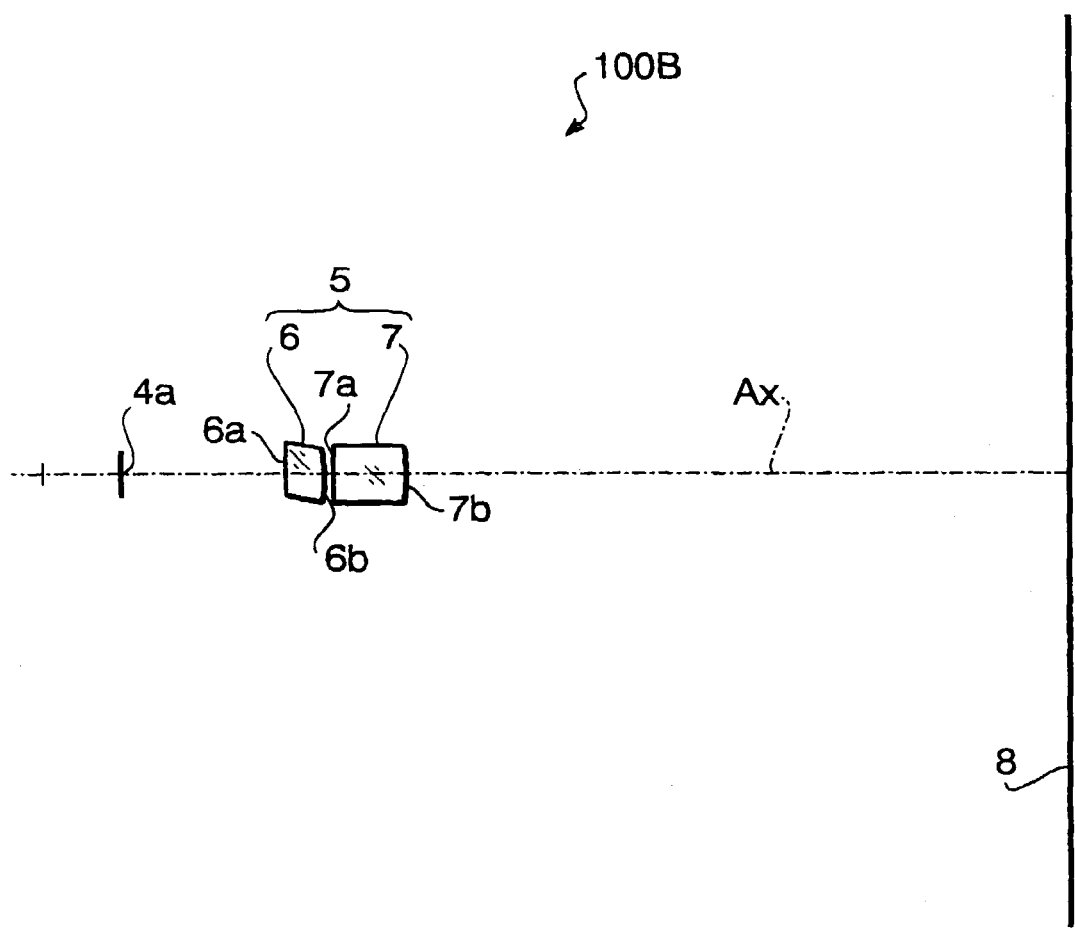
FIG. 8 shows a configuration of a scanning unit employing a scanning optical system according to the second embodiment in an auxiliary scanning direction.

FIGS. 7 and 8 show the configuration of the scanning unit 100B employing a scanning optical system 5 according to the second embodiment. As shown in the drawings, according to the second embodiment, the scanning optical system 5 includes, from the polygonal mirror side to the surface 8 side, a first lens 6 that is a positive meniscus lens made of plastic and a second lens 7 that is a plano-convex lens made of glass. The polygonal mirror 4 side surface of the first lens 6 is formed as a concave surface, and the polygonal mirror 4 side surface of the second lens 7 is formed as a planar surface.

Each of the polygonal mirror side surface 6a (first surface) and the scanned surface side surface 6b (second surface) is formed as an anamorphic aspherical surface.

Each of the first surface 6a and the second surface 6b is arranged such that the surface reference axis thereof is decentered, i.e., shifted with respect to the reference beam axis Ax in the auxiliary scanning direction.

The polygonal mirror side surface 7a (third surface) of the second lens 7 is a planar surface, and the scanned surface side surface 7b (fourth surface) of the second lens 7 is a toric surface as in the first embodiment.

TABLE 3 below indicates a structure of the scanning unit 100B, from the reflection surface 4a to the surface 8 to be scanned. The labels in TABLE 3 are similar to those in TABLE 1, description thereof will be omitted herein.

TABLE 3

| Focal Length | 135.3 mm |
|---|---|
| Scanning Width | 216 mm |
| fz | 34.68 mm |
| fgz | 48.19 mm |
| m | −2.86 |
| Design Wavelength | 780 nm |

Decentering Amount in Auxiliary Scanning Direction

| | |
|---|---|
| δ1 | 1.25 mm |
| δ2 | −0.25 mm |
| L2 | 0.42 mm |

TABLE 3-continued

| No. | R (mm) | Rz (mm) | Distance (mm) | N |
|---|---|---|---|---|
| 0 |  |  | 32.20 |  |
| 1 | −8694.80 | −82.33 | 7.50 | 1.48617 |
| 2 | −173.70 | −32.53 | 2.00 |  |
| 3 | infinity |  | 12.50 | 1.51072 |
| 4 | −109.20 | −24.61 | 133.80 |  |

Coefficients defining the first surface 6a and the second surface 6b of the first lens for the formulae (4) and (5) indicated in TABLE 4.

TABLE 4

|  | No. 1 | No. 2 |
|---|---|---|
| k | 0.00 | 0.00 |
| $A_4$ | $-3.29 \times 10^{-6}$ | $-2.10 \times 10^{-6}$ |
| $A_6$ | $1.64 \times 10^{-9}$ | $2.97 \times 10^{-10}$ |
| $A_8$ | $-1.93 \times 10^{-13}$ | $1.89 \times 10^{-13}$ |
| $B_1$ | $-8.65 \times 10^{-6}$ | $4.48 \times 10^{-5}$ |
| $B_2$ | $-1.59 \times 10^{-7}$ | $1.40 \times 10^{-5}$ |
| $B_3$ | 0.00 | 0.00 |
| $B_4$ | $-1.83 \times 10^{-9}$ | $-9.96 \times 10^{-9}$ |
| $B_5$ | 0.00 | 0.00 |
| $B_6$ | $9.89 \times 10^{-13}$ | $3.83 \times 10^{-12}$ |

FIGS. 9 through 12 are graphs indicating performance of the scanning optical system according to the second embodiment.

Figure 9:
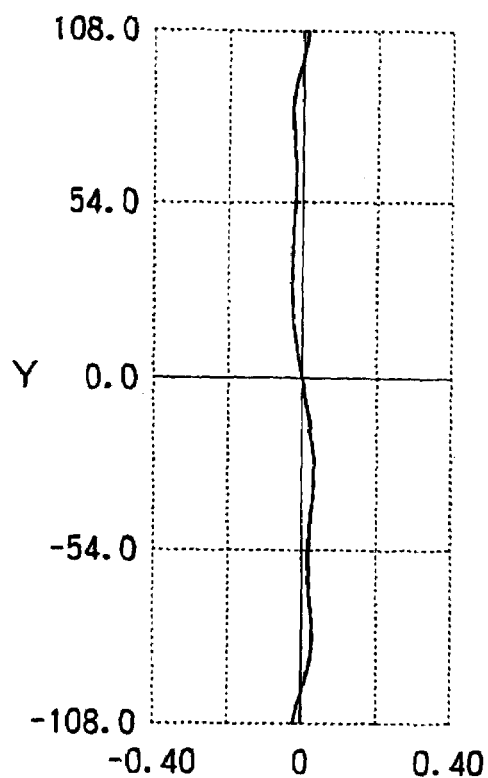
FIG. 9 shows a graph indicating an fθ characteristic of the scanning optical system according to the second embodiment.
Figure 10:
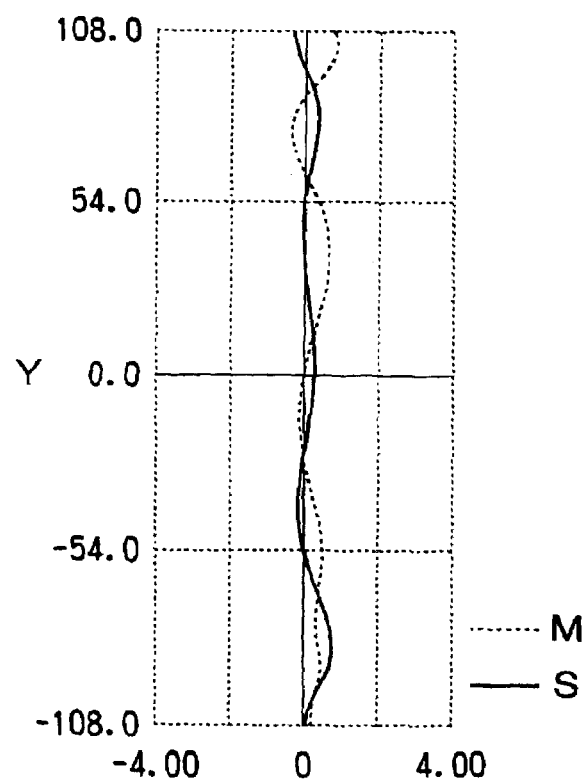
FIG. 10 shows a graph indicating curvature of field of the scanning optical system according to the second embodiment.
Figure 11:
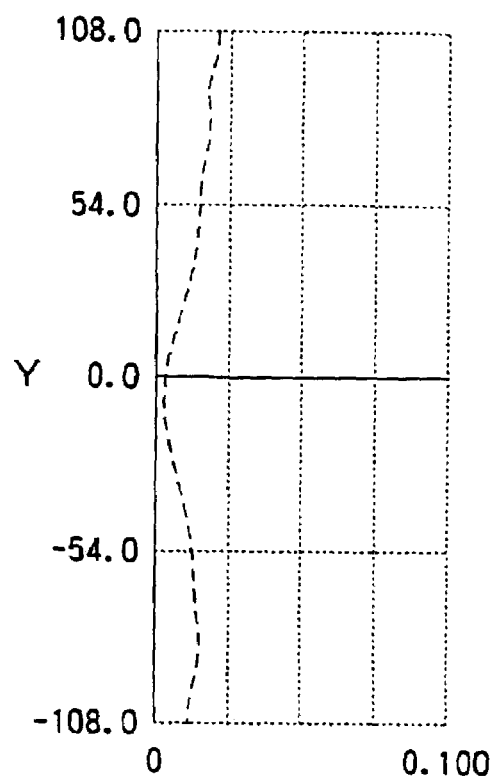
FIG. 11 shows a graph indicating wavefront aberration of the scanning optical system according to the second embodiment.
Figure 12:
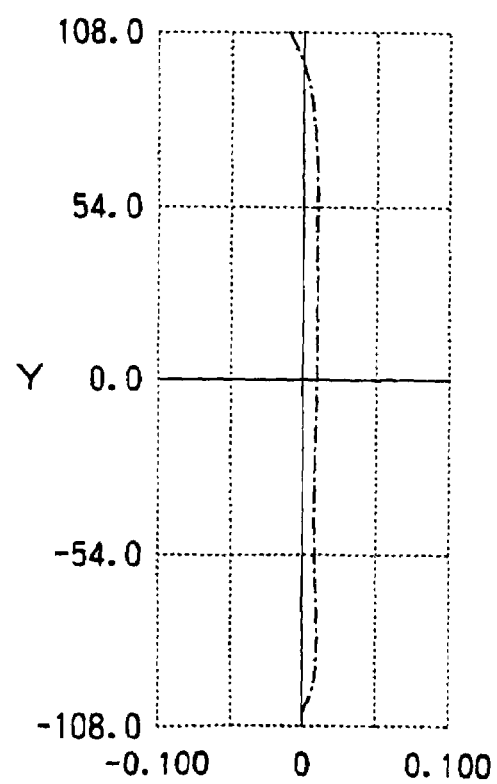
FIG. 12 shows a graph indicating bow of the scanning optical system according to the second embodiment.

FIG. 9 indicates an fθ characteristic, FIG. 10 indicates curvature of field (solid line: auxiliary scanning direction; and broken line: main scanning direction), FIG. 11 indicates an RMS of wavefront aberration and FIG. 12 indicates bow.

THIRD EMBODIMENT

Figure 13:
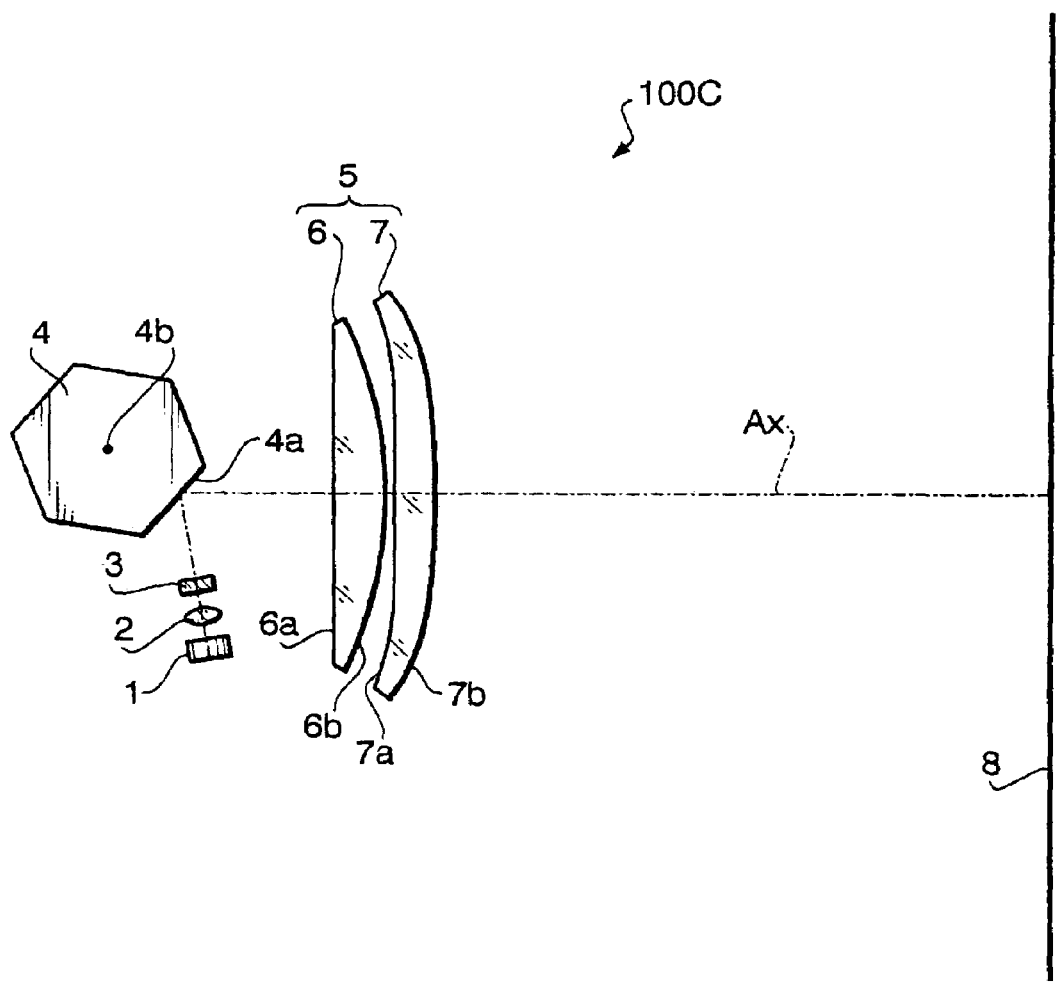
FIG. 13 shows a configuration of a scanning unit employing a scanning optical system according to a third embodiment in a main scanning direction.
Figure 14:
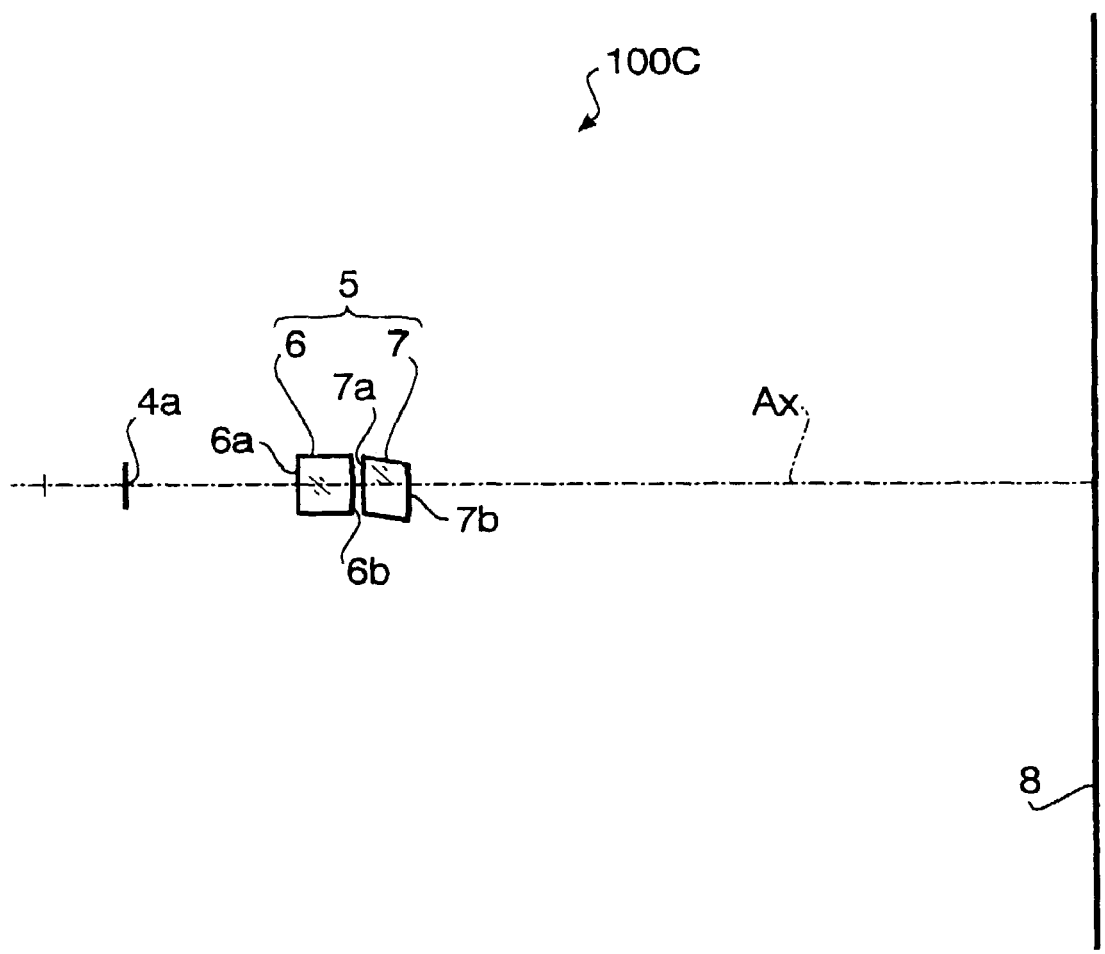
FIG. 14 shows a configuration of a scanning unit employing a scanning optical system according to the third embodiment in an auxiliary scanning direction.

FIGS. 13 and 14 show the configuration of the scanning unit 100C employing a scanning optical system according to the third embodiment. As shown in the drawings, according to the third embodiment, the scanning optical system 5 includes, from the polygonal mirror side to the surface 8 side, a first lens 6 that is a plano-convex lens made of glass and a second lens 7 that is a biconvex lens, at a paraxial region, made of plastic.

The polygonal mirror side surface 6a (first surface) is a planar surface, and the scanned surface side surface 6b (second surface) of the first lens 6 is formed as a toric surface.

Each of the polygonal mirror side surface 7a (third surface) and the scanned surface side surface 7b (fourth surface) of the second lens 7 is an anamorphic aspherical surface. Each of the third surface 7a and the fourth surface 7b is arranged such that the surface reference axis thereof is decentered, i.e., shifted with respect to the reference beam axis Ax, in the auxiliary scanning direction.

TABLE 5 below indicates a structure of the scanning unit 100C, from the reflection surface 4a to the surface 8 to be scanned. The labels in TABLE 5 are similar to those in TABLE 1, and description thereof will be omitted herein. It should be noted that, according to the third embodiment, fgz is a focal length in the auxiliary scanning direction of the first lens 6 alone. Further, δ1 represents a shifting amount, in the auxiliary scanning direction, of the surface reference axis of the third surface 7a with respect to the reference beam axis Ax, δ2 is a shifting amount, in the auxiliary scanning direction, of the surface reference axis of the fourth surface 7b with respect to the reference beam axis Ax, "L1" represents a shifting amount of the surface reference axes of the first and second surfaces 6a and 6b (i.e., the shifting amount of the first lens 6) with respect to the reference scanning plane (i.e., the reference beam axis Ax) in the auxiliary scanning direction

TABLE 5

| Focal Length | 135.4 mm |
| Scanning Width | 216 mm |
| fz | 32.11 mm |
| fgz | 39.92 mm |
| m | −3.21 |
| Design Wavelength | 780 nm |

| Decentering Amount in Auxiliary Scanning Direction | |
|---|---|
| δ1 | 0.25 mm |
| δ2 | −2.00 mm |
| L1 | 0.41 mm |

| No. | R (mm) | Rz (mm) | Distance (mm) | N |
|---|---|---|---|---|
| 0 |  |  | 32.20 |  |
| 1 | infinity |  | 10.50 | 1.51072 |
| 2 | −94.70 | −20.39 | 2.00 |  |
| 3 | 419.50 | 267.30 | 8.20 | 1.48617 |
| 4 | −557.80 | −89.30 | 129.00 |  |

Coefficients defining the third surface 7a and the fourth surface 7b for the formulae (4) and (5) are indicated in TABLE 6.

TABLE 6

|  | No. 3 | No. 4 |
|---|---|---|
| k | 0.00 | 0.00 |
| $A_4$ | $-2.09 \times 10^{-6}$ | $-1.63 \times 10^{-6}$ |
| $A_6$ | $1.21 \times 10^{-10}$ | $-4.27 \times 10^{-11}$ |
| $A_8$ | $-4.43 \times 10^{-15}$ | $-5.02 \times 10^{-15}$ |
| $B_1$ | $-4.09 \times 10^{-5}$ | $3.59 \times 10^{-6}$ |
| $B_2$ | $-8.71 \times 10^{-6}$ | $1.50 \times 10^{-6}$ |
| $B_3$ | 0.00 | 0.00 |
| $B_4$ | $2.39 \times 10^{-9}$ | $-1.60 \times 10^{-9}$ |
| $B_5$ | 0.00 | 0.00 |
| $B_6$ | $-7.26 \times 10^{-13}$ | $2.91 \times 10^{-13}$ |

FIGS. 15 through 18 are graphs indicating performance of the scanning optical system according to the third embodiment.

Figure 15:
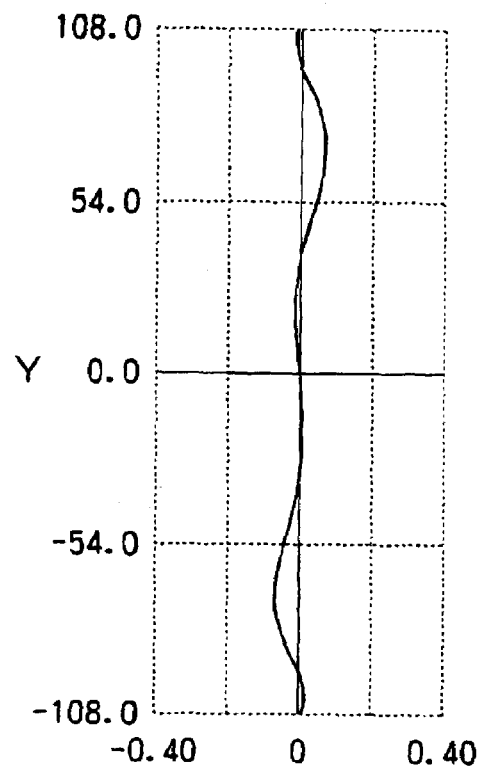
FIG. 15 shows a graph indicating an fθ characteristic of the scanning optical system according to the third embodiment.
Figure 16:
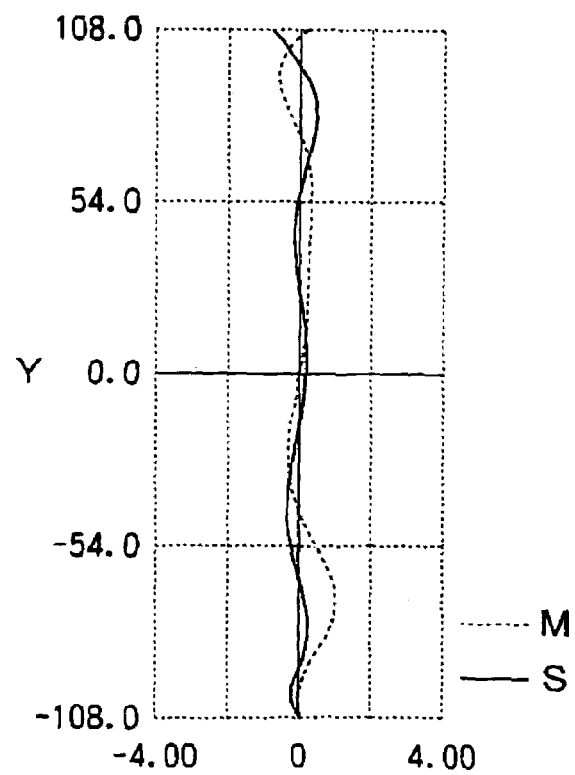
FIG. 16 shows a graph indicating curvature of field of the scanning optical system according to the third embodiment.
Figure 17:
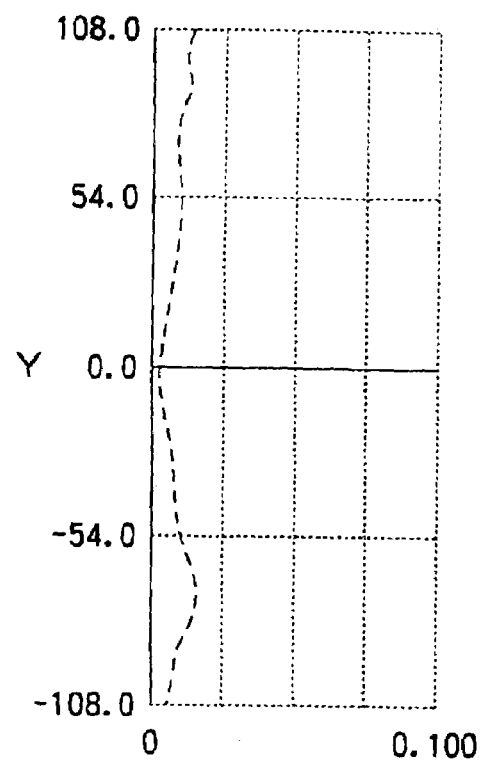
FIG. 17 shows a graph indicating wavefront aberration of the scanning optical system according to the third embodiment.
Figure 18:
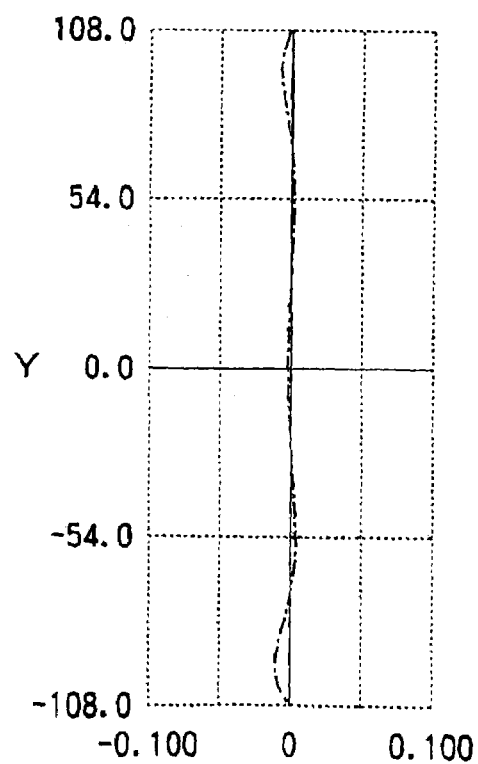
FIG. 18 shows a graph indicating bow of the scanning optical system according to the third embodiment.

FIG. 15 indicates an fθ characteristic, FIG. 16 indicates curvature of field (solid line: auxiliary scanning direction; and broken line: main scanning direction), FIG. 17 indicates an RMS of wavefront aberration and FIG. 18 indicates bow.

FOURTH EMBODIMENT

Figure 19:
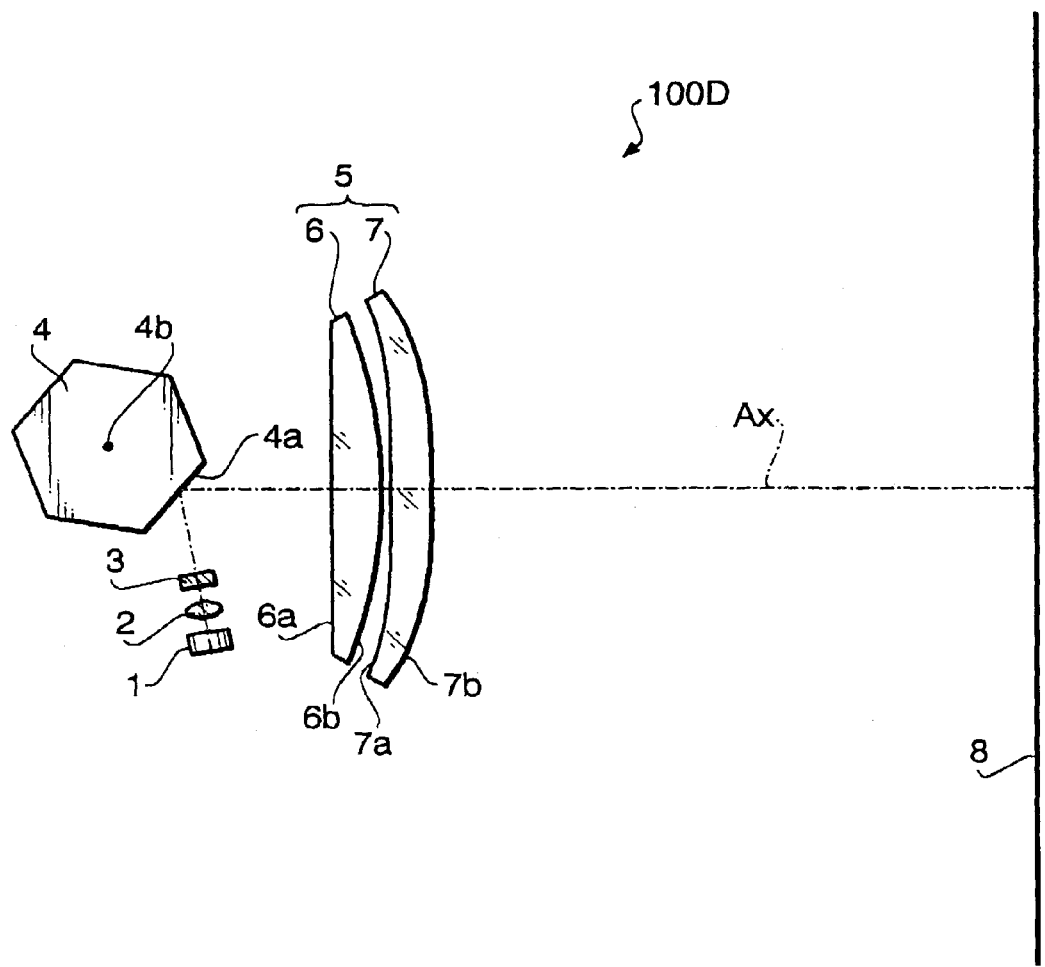
FIG. 19 shows a configuration of a scanning unit employing a scanning optical system according to a fourth embodiment in a main scanning direction.
Figure 20:
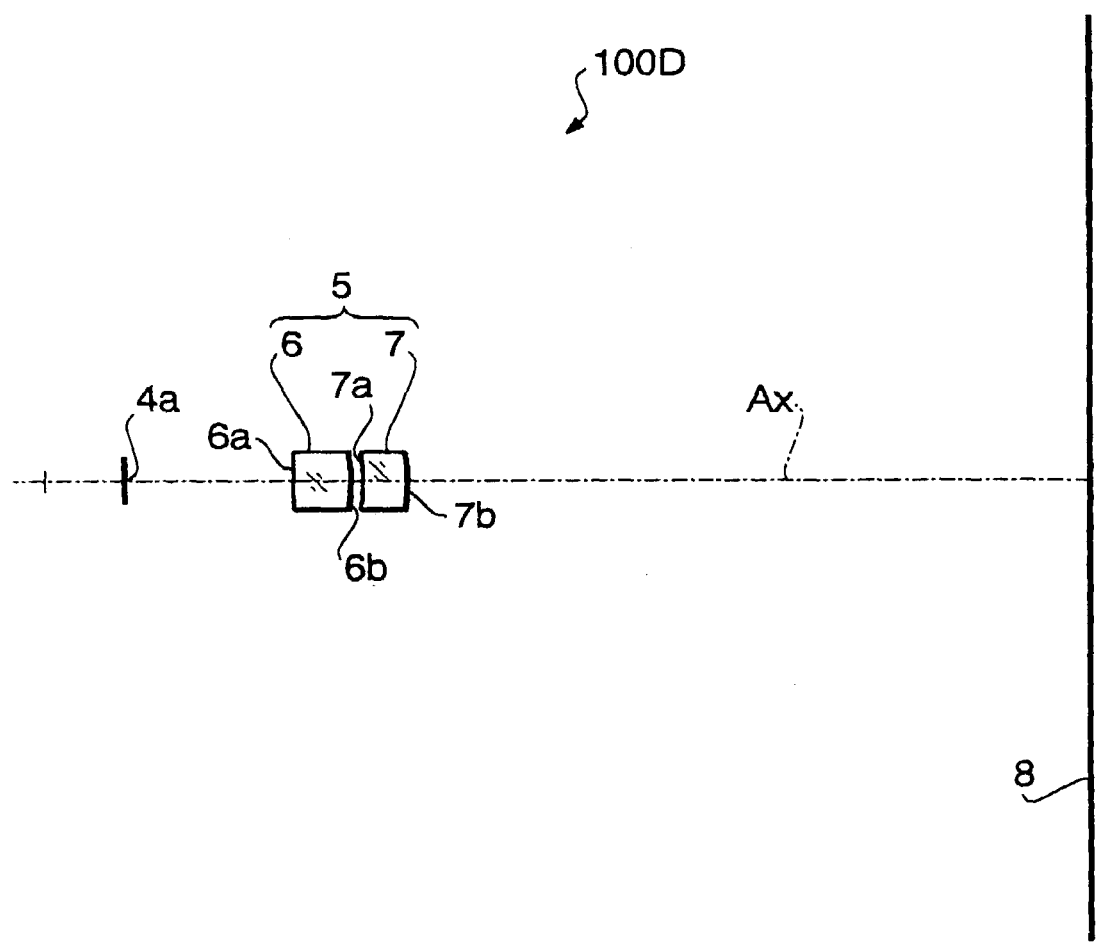
FIG. 20 shows a configuration of a scanning unit employing a scanning optical system according to the fourth embodiment in an auxiliary scanning direction.

FIGS. 19 and 20 show the configuration of the scanning unit 100D employing a scanning optical system 5 according to the fourth embodiment. As shown in the drawings, according to the fourth embodiment, the scanning optical system 5 includes, from the polygonal mirror side to the surface 8 side, a first lens 6 that is a plano-convex lens made of glass and a second lens 7 that is a biconvex lens, at a paraxial region, made of plastic.

The polygonal mirror side surface 6a (first surface) is a planar surface, and the scanned surface side surface 6b (second surface) of the first lens 6 is formed as a toric surface.

Each of the polygonal mirror side surface 7a (third surface) and the scanned surface side surface 7b (fourth surface) of the second lens 7 is an anamorphic aspherical surface. According to the fourth embodiment, each of the third surface 7a and the fourth surface 7b is decentered such that the surface reference axis thereof is inclined (not shifted or translated) with respect to the reference beam axis Ax, in the auxiliary scanning direction.

TABLE 7 below indicates a structure of the scanning unit 100D, from the reflection surface 4a to the surface 8 to be scanned. The labels in TABLE 7 are similar to those in TABLE 1, and description thereof will be omitted herein. It should be noted that, according to the fourth embodiment, fgz is a focal length in the auxiliary scanning direction of the first lens 6 alone. Further, δ1 represents an inclination angle, in the auxiliary scanning direction, of the surface reference axis of the third surface 7a with respect to the reference beam axis Ax, δ2 is an inclination angle, in the auxiliary scanning direction, of the surface reference axis of the fourth surface 7b with respect to the reference beam axis Ax, "L1" represents a shifting amount of the surface reference axes of the first and second surfaces 6a and 6b (i.e., the shifting amount of the first lens 6) with respect to the reference scanning plane (i.e., the reference beam axis Ax) in the auxiliary scanning direction.

TABLE 7

| Focal Length | 135.4 mm |
|---|---|
| Scanning Width | 216 mm |
| fz | 32.62 mm |
| fgz | 36.61 mm |
| m | −3.14 |
| Design Wavelength | 780 nm |

| Decentering Amount in Auxiliary Scanning Direction | |
|---|---|
| δ1 | −2.00° |
| δ2 | −0.45° |
| L1 | 0.48 mm |

| No. | R (mm) | Rz (mm) | Distance (mm) | N |
|---|---|---|---|---|
| 0 | | | 32.20 | |
| 1 | infinity | | 11.00 | 1.60910 |
| 2 | −113.50 | −22.30 | 2.00 | |
| 3 | 1443.90 | −81.36 | 8.70 | 1.48617 |
| 4 | −275.70 | −44.28 | 129.40 | |

Coefficients defining the third surface 7a and the surface 7b for the formulae (4) and (5) are indicated TABLE 8.

TABLE 8

| | No. 3 | No. 4 |
|---|---|---|
| k | 0.00 | 0.00 |
| $A_4$ | −2.40 × 10$^{-6}$ | −1.84 × 10$^{-6}$ |
| $A_6$ | 4.30 × 10$^{-10}$ | −1.17 × 10$^{-10}$ |
| $A_8$ | −2.95 × 10$^{-14}$ | 1.22 × 10$^{-14}$ |
| $B_1$ | −1.96 × 10$^{-5}$ | 2.36 × 10$^{-5}$ |
| $B_2$ | −1.20 × 10$^{-5}$ | −7.52 × 10$^{-7}$ |
| $B_3$ | 0.00 | 0.00 |
| $B_4$ | −1.40 × 10$^{-9}$ | −5.28 × 10$^{-9}$ |
| $B_5$ | 0.00 | 0.00 |
| $B_6$ | 2.15 × 10$^{-12}$ | 2.67 × 10$^{-12}$ |

FIGS. 21 through 24 are graphs indicating performance of the scanning optical system according to the fourth embodiment.

Figure 21:
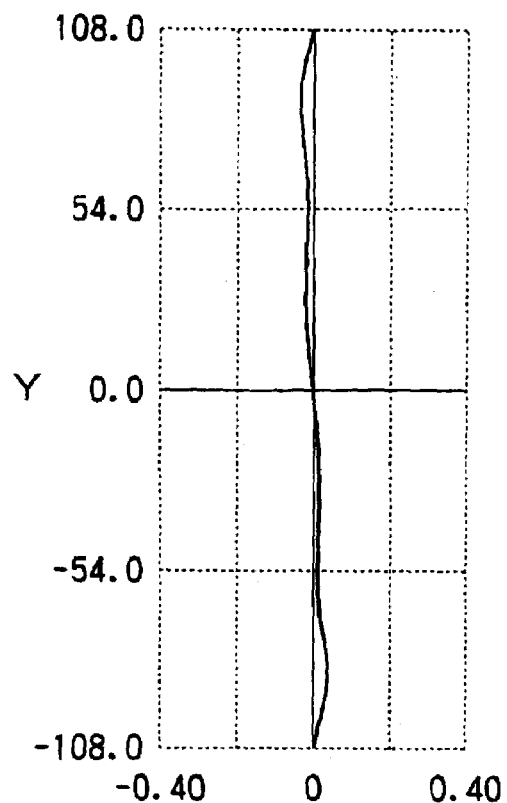
FIG. 21 shows a graph indicating an fθ characteristic of the scanning optical system according to the fourth embodiment.
Figure 22:
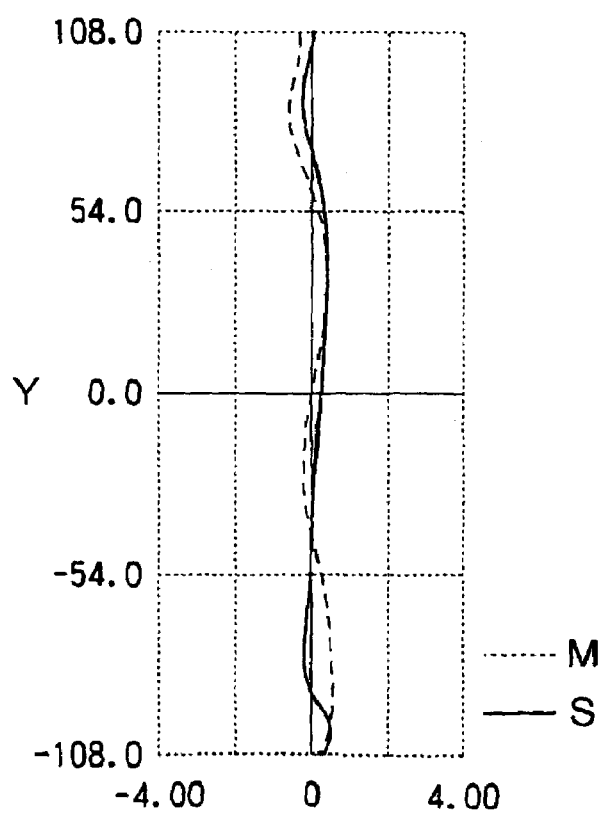
FIG. 22 shows a graph indicating curvature of field of the scanning optical system according to the fourth embodiment.
Figure 23:
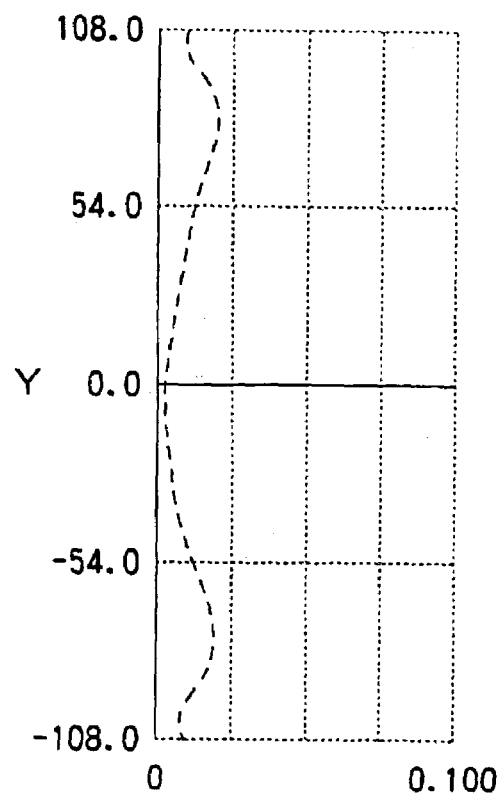
FIG. 23 shows a graph indicating wavefront aberration of the scanning optical system according to the fourth embodiment.
Figure 24:
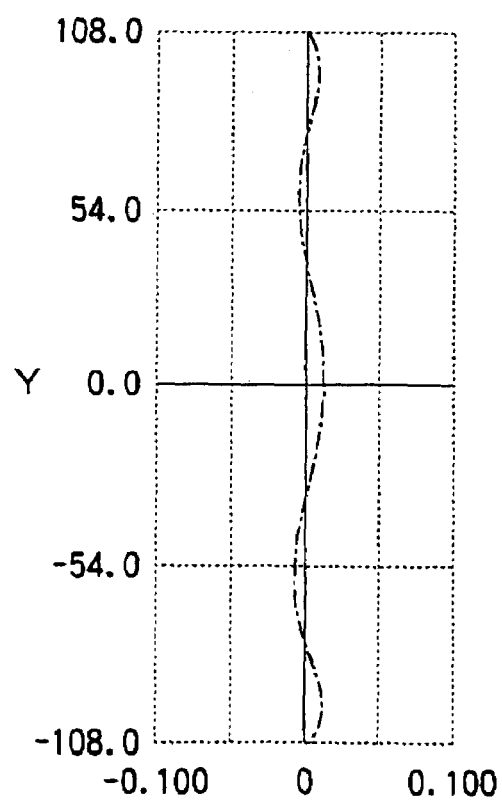
FIG. 24 shows a graph indicating bow of the scanning optical system according to the fourth embodiment.

FIG. 21 indicates an fθ characteristic, FIG. 22 indicates curvature of field (solid line: auxiliary scanning direction; and broken line: main scanning direction), FIG. 23 indicates an RMS of wavefront aberration and FIG. 24 indicates bow.

TABLE 9 shows values of |δ1−δ2|, fgz/fz and |m| (for conditions (1)–(3) which are presented below again) of the first through fourth embodiments, which are calculated based on the values indicated in TABLEs 1, 3, 5 and 7.

Conditions are:

$$1.0 < |\delta 1 - \delta 2| < 3.0 \quad (1);$$

$$0.7 < fgz/fz < 1.8 \quad (2); \text{ and}$$

$$1.0 < |m| < 4.0 \quad (3).$$

TABLE 9

| | 1st emb. | 2nd emb. | 3rd emb. | 4th emb. |
|---|---|---|---|---|
| |δ1−δ2| | 2.50 | 1.50 | 2.25 | — |
| fgz/fz | 1.32 | 1.39 | 1.24 | 1.12 |
| |m| | 2.87 | 2.86 | 3.21 | 3.14 |

As understood from TABLE 9, in all the embodiments (except for condition (1) of the 4th embodiment since δ1 and δ2 are angles), the conditions are satisfied. In such embodiments, as indicated in graphs, sufficient performance as a scanning optical system is achieved as the curvature of field is well compensated for. Further, bow and/or inclination of the scanning line, wavefront distortion which may occur due to the decentering (shift or inclination) of the lens surfaces can be well suppressed.

The present disclosure relates to the subject matter contained in Japanese Patent Application No. 2002-026590, filed on Feb. 4, 2002, which is expressly incorporated herein by reference in its entirety.

What is claimed is:

1. A scanning optical system for converging a beam scanning in a main scanning direction on a surface to be scanned, comprising a first lens element and a second lens element, at least one of said first lens element and said second lens element being a plastic lens element formed of plastic material,
wherein each of two surfaces of said plastic lens element is an aspherical surface that is configured such that a shape in a main scanning plane is defined as a function of a distance, in the main scanning direction, from a surface reference axis thereof and that a curvature in an auxiliary scanning plane which is perpendicular to the main scanning plane is defined as another function of a distance, in the main scanning direction, from the surface reference axis, and
wherein at least one of said two surfaces of said plastic lens element is arranged such that the surface reference axis thereof is decentered from a reference beam axis in the auxiliary scanning direction.

2. The scanning optical system according to claim 1, wherein the surface reference axis of said at least one of said two surfaces of said plastic lens element is parallely shifted in the auxiliary scanning plane with respect to the reference beam axis.

3. The scanning optical system according to claim 1, wherein both of said two surfaces of said plastic lens element are arranged such that the surface reference axes thereof are decentered from the reference beam axis in the auxiliary scanning direction, respectively.

4. The scanning optical system according to claim 3, wherein each of the surface reference axes of said two surfaces of said plastic lens element is parallely shifted, in the auxiliary scanning plane, with respect to the reference beam axis.

5. The scanning optical system according to claim 4, said two surfaces of said plastic lens element being arranged to satisfy condition:

$1.0<|\delta 1-\delta 2|<3.0$, wherein, δ1 and δ2 (unit: mm) represent decentering amounts of the surface reference axes of said two lens surfaces with respect to the reference beam axis.

6. The scanning optical system according to claim 4,
wherein said two lens elements are the plastic lens element and a glass lens element,
wherein two lens surfaces of said glass lens element are a planar surface and a toric surface, respectively; and
wherein said scanning optical system is configured to satisfy condition:

$0.7<fgz/fz<1.8$, where, fgz is a focal length of said glass lens element in the auxiliary scanning direction, and fz is a focal length of the entire scanning optical system in the auxiliary scanning direction.

7. The scanning optical system according to claim 4, which is configured to satisfy condition:

$1.0<|m|<4.0$, where, m represents a magnification of said scanning optical system in the auxiliary scanning direction.

8. The scanning optical system according to claim 3, wherein each of the surface reference axes of said two surface of said plastic lens element is inclined, in the auxiliary scanning plane, with respect to the reference beam axis.

9. The scanning optical system according to claim 8,
wherein said two lens elements are the plastic lens element and a glass lens element,
wherein two lens surfaces of said glass lens element are a planar surface and a toric surface, respectively; and
wherein said scanning optical system is configured to satisfy condition:

$0.7<fgz/fz<1.8$, where, fgz is a focal length of said glass lens element in the auxiliary scanning direction, and fz is a focal length of the entire scanning optical system in the auxiliary scanning direction.

10. The scanning optical system according to claim 9, which is configured to satisfy condition:

$1.0<|m|<4.0$, where, m represents a magnification of said scanning optical system in the auxiliary scanning direction.

11. A scanning unit, comprising:
a light source that emits a beam;
a deflector that deflects the beam to scan within a predetermined angular range in a main scanning direction; and
a scanning optical system for converging the beam scanned by the deflector on a surface to be scanned, said scanning system comprising a first lens element and a second lens element, at least one of said first lens element and said second lens element being a plastic lens element formed of plastic material,
wherein each of two surfaces of said plastic lens element is an aspherical surface that is configured such that a shape in a main scanning plane is defined as a function of a distance, in the main scanning direction, from a surface reference axis thereof and that a curvature in an auxiliary scanning plane which is perpendicular to the main scanning plane is defined as another function of a distance, in the main scanning direction, from the surface reference axis, and
wherein at least one of said two surfaces of said plastic lens element is arranged such that the surface reference axis thereof is decentered from a reference beam axis in the auxiliary scanning direction.

12. The scanning unit according to claim 11, wherein both of said two surfaces of said plastic lens element are arranged such that the surface reference axes thereof are decentered from the reference beam axis in the auxiliary scanning direction, respectively.

13. The scanning unit according to claim 12,
wherein said two lens elements are the plastic lens element and a glass lens element,
wherein two lens surfaces of said glass lens element are a planar surface and a toric surface, respectively; and
wherein said scanning optical system is configured to satisfy condition:

$0.7<fgz/fz<1.8$, where, fgz is a focal length of said glass lens element in the auxiliary scanning direction, and fz is a focal length of the entire scanning optical system in the auxiliary scanning direction.

14. The scanning unit according to claim 12, which is configured to satisfy condition:

$1.0<|m|<4.0$, where, m represents a magnification of said scanning optical system in the auxiliary scanning direction.

15. The scanning unit according to claim 12, wherein each of the surface reference axes of said two surfaces of said plastic lens element is parallely shifted, in the auxiliary scanning plane, with respect to the reference beam axis.

16. The scanning unit according to claim 15, said two surfaces of said plastic lens element being arranged to satisfy condition:

$1.0<|\delta 1-\delta 2|<3.0$, wherein, δ1 and δ2 (unit: mm) represent decentering amounts of the surface reference axes of said two lens surfaces with respect to the reference beam axis.

17. The scanning unit according to claim 12, wherein each of the surface reference axes of said two surface of said plastic lens element is inclined, in the auxiliary scanning plane, with respect to the reference beam axis.

* * * * *